March 15, 1960 — S. LENET — 2,928,669
SPRING LIFT
Filed Dec. 13, 1956
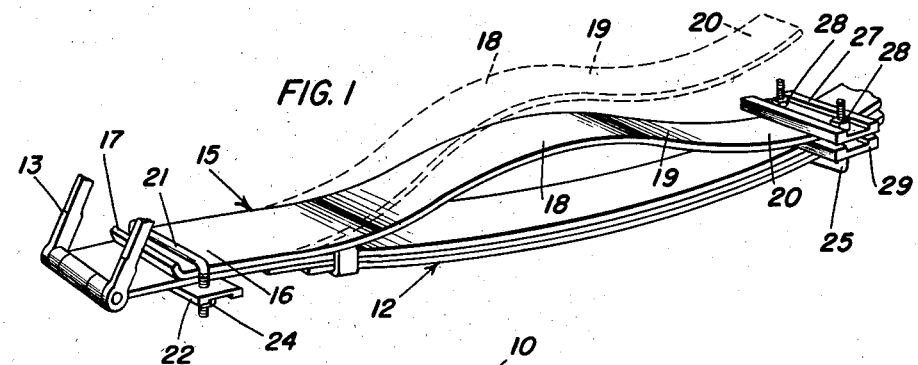
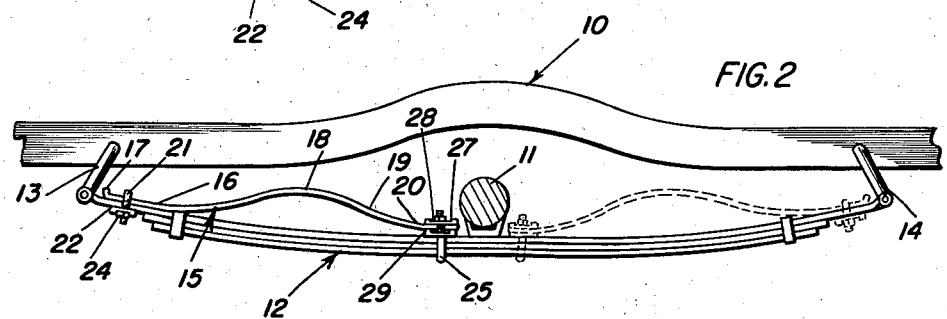
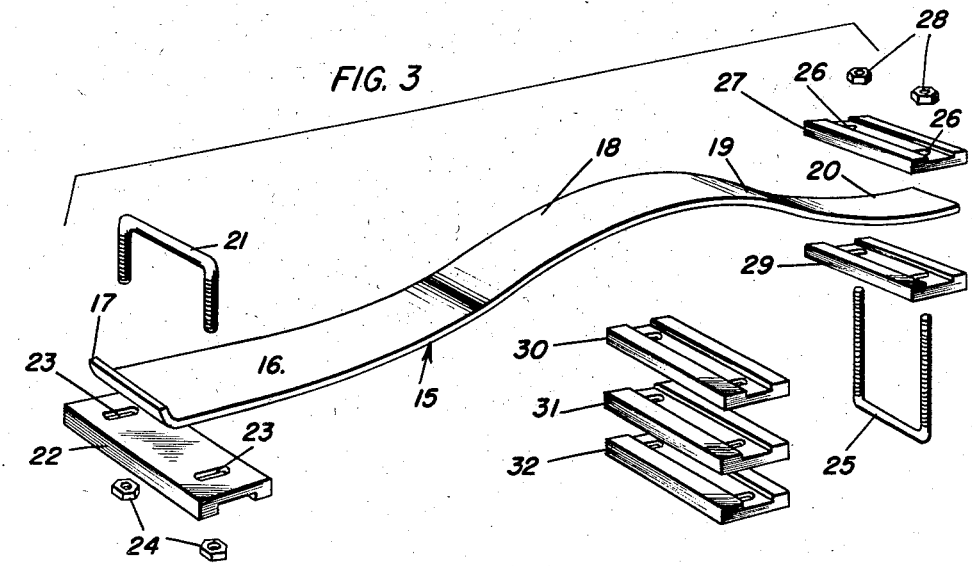
INVENTOR.
Sidney Lenet
BY
ATTORNEY

United States Patent Office 2,928,669
Patented Mar. 15, 1960

2,928,669

SPRING LIFT

Sidney Lenet, Philadelphia, Pa.

Application December 13, 1956, Serial No. 628,094

3 Claims. (Cl. 267—48)

The present invention relates to vehicle springs and more particularly to an improved form of reinforcement for leaf type vehicle springs.

In vehicles employing leaf type springs, it is often desirable to strengthen the springs so that heavier loads may be carried without danger of spring breakage, or to improve the riding qualities of the vehicle under conditions of heavy load or other road conditions.

It is therefore a primary object of the present invention to provide an improved reinforcing means for leaf type vehicle springs which will reduce sway and road shock and add stability on curves.

A further object of the invention is to provide a spring reinforcing means which may be adjustable to vary the load carrying capacity and to vary the riding qualities of the vehicle to suit the desires of the individual drivers.

A still further object of the invention is to provide a spring attachment which will automatically restore the true arc to sagging springs, prevent excessive torque of rear axle housing due to sudden acceleration and which can be quickly installed to existing leaf springs without touching any of the original nuts or bolts.

With the above objects in view, together with such additional objects and advantages as may subsequently appear, the invention will be more fully described in connection with the accompanying drawing, wherein:

Figure 1 is a detail perspective view of a vehicle leaf spring with the device of the present invention applied thereto.

Figure 2 is a fragmentary side elevation of a vehicle chassis showing the application of the invention to the vehicle spring.

Figure 3 is an exploded view of the component parts of the invention shown in perspective.

Referring to the drawing, and particularly to Figure 2, the vehicle chassis is indicated by numeral 10, with 11 representing the axle, and numeral 12 the usual leaf spring supported by shackles 13 and 14.

The invention comprises a spring steel bar 15 which is of substantially the same width as the vehicle spring on which it is used. The anchor portion 16 of the bar is substantially flat and terminates at one end in an upturned end 17. This flat portion of the bar has a fulcrum-like contact with the leaf spring. The other end of the flat portion curves upwardly to slightly bowed portion 18 and then curves downwardly a short distance at 19 and then flattens out slightly at 20 in a plane higher than the plane of anchor portion 16. This is shown in dotted line position in Figure 1.

To apply the bar to a vehicle spring, the bar is positioned on the top of the spring with the anchor portion 16 adjacent the shackle 13 and it is clamped to the spring by a U-bolt 21 and its cross bar 22 with the legs of the U-bolt extending through slots 23 formed in the cross bar and engaged by nuts 24 threaded thereon. As here shown, the cross bar bears against the under side of the leaf spring for ready access to the nuts 24.

As previously described, the bar is so shaped that when thus clamped to the leaf spring, the active end of the bar, denoted by numeral 20, will be positioned a considerable distance from the spring as indicated in dotted lines in Figure 1. The active end of the bar 15 is then sprung toward the vehicle leaf spring and secured thereto by a U-bolt 25 straddling the lower surface of the leaf spring and extending through slots 26 of a cross bar 27 and anchored thereto by nuts 28. A spacer plate 29 similar to cross bar 27 may be interposed between the leaf spring 12 and the bar 15 to vary the pressure on the leaf spring. In order to provide different adjustments for the pressure section which is the flat portion of the bar, additional spacer plates 30, 31 or 32 may be added to the spacer plate 29.

While a single bar will accomplish the objects and advantages set forth, a second bar can be added to the opposite end of the leaf spring adjacent shackle 14 to increase the load capacity and this is shown in dotted lines in Figure 2.

It is believed that the construction, operation, and advantages of the invention will now be apparent. While a preferred embodiment has been disclosed, minor changes in the details of construction may be made without departing from the spirit of the invention except as may be required by the scope of the following claims.

Having thus described the invention, what is claimed is:

1. The combination with a multiple leaf type of vehicle spring of reinforcing means, said means comprising a metal bar, means connecting one end of said bar to the upper side of the vehicle spring adjacent one end of said spring, a flat portion on said bar adjacent said end in fulcrum-like contact with said spring, said flat portion extending into an upwardly curved portion which in turn terminates in a downwardly extending portion normally terminating a distance above said spring, and means securing said last named portion to the vehicle spring under pressure and spacer means interposed between said last mentioned portion and the vehicle spring.

2. The combination recited in claim 1, in which said spacer means comprises a spacer plate interposed between said last named portion and the vehicle spring.

3. The combination recited in claim 1 in which said spacer means comprises a plurality of spacer plates interposed between said last named portion and the vehicle spring.

References Cited in the file of this patent

UNITED STATES PATENTS

| | | |
|---|---|---|
| 1,975,263 | Fageol | Oct. 2, 1934 |
| 2,058,281 | Wesley | Oct. 20, 1936 |
| 2,205,086 | Dell | June 18, 1940 |
| 2,656,181 | Hellwig | Oct. 20, 1953 |